US012259954B1

United States Patent
Dave et al.

(10) Patent No.: US 12,259,954 B1
(45) Date of Patent: Mar. 25, 2025

(54) DIFFERENTIAL ACCESS IN THE METAVERSE

(71) Applicant: Wells Fargo Bank, N.A., San Francisco, CA (US)

(72) Inventors: Aparna M. Dave, Houston, TX (US); Eileen S. Dunlap, Charlotte, NC (US); Craig Moore, Creve Coeur, MO (US); Paul W. Mussell, Minneapolis, MN (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 337 days.

(21) Appl. No.: 18/056,302

(22) Filed: Nov. 17, 2022

(51) Int. Cl.
  *G06F 21/31* (2013.01)
  *G06Q 20/10* (2012.01)
  *G06T 13/40* (2011.01)

(52) U.S. Cl.
  CPC ......... *G06F 21/31* (2013.01); *G06Q 20/1085* (2013.01); *G06T 13/40* (2013.01)

(58) Field of Classification Search
  CPC ....... G06F 21/31; H04L 67/01; H04L 67/131; H04L 9/40; H04L 41/28; A63F 13/40; A63F 13/73; A63F 13/79
  See application file for complete search history.

(56) References Cited

U.S. PATENT DOCUMENTS

| | | | |
|---|---|---|---|
| 2008/0215994 A1* | 9/2008 | Harrison | H04L 67/131 715/757 |
| 2009/0144633 A1* | 6/2009 | Schultz | G06Q 20/12 715/742 |
| 2010/0064359 A1* | 3/2010 | Boss | H04L 63/08 726/7 |
| 2010/0229235 A1* | 9/2010 | Dawson | H04L 9/3265 713/171 |
| 2010/0299747 A1* | 11/2010 | Hamilton, II | H04L 9/3247 726/19 |
| 2011/0126272 A1* | 5/2011 | Betzler | G06F 21/41 726/6 |
| 2013/0047217 A1* | 2/2013 | Shuster | G06F 40/143 726/4 |
| 2017/0165578 A1 | 6/2017 | Hamilton, II et al. | |
| 2019/0057551 A1* | 2/2019 | Mathwig | G06F 3/011 |
| 2019/0370492 A1* | 12/2019 | Falchuk | H04W 12/67 |
| 2020/0066056 A1* | 2/2020 | Goodsitt | G06F 21/34 |
| 2021/0383377 A1* | 12/2021 | Zhou | H04L 9/3213 |
| 2022/0116231 A1 | 4/2022 | Choi | |
| 2022/0321351 A1* | 10/2022 | Yucra Rodriguez | H04L 51/42 |
| 2023/0039323 A1* | 2/2023 | Marchiorello | G06T 19/00 |
| 2023/0316263 A1* | 10/2023 | Eby | H04L 9/3271 |
| 2024/0013200 A1* | 1/2024 | Singh | H04L 9/50 |
| 2024/0022561 A1* | 1/2024 | Ingram | H04L 63/08 |
| 2024/0152902 A1* | 5/2024 | Rapowitz | G06Q 20/367 |

* cited by examiner

*Primary Examiner* — Eric W Shepperd
(74) *Attorney, Agent, or Firm* — Merchant & Gould P.C.

(57) ABSTRACT

Differentiation of access within the metaverse. According to one aspect, a metaverse visualization of an environment is modified as viewed by an avatar upon access of the environment by another avatar. According to another aspect, access of an avatar to a restricted access environment within the metaverse enables trusted avatars selective access to the restricted access environment together with the avatar.

17 Claims, 8 Drawing Sheets

DIFFERENTIAL ACCESS IN THE METAVERSE

BACKGROUND

The metaverse can be envisioned as an immersive world that is typically facilitated through the use of virtual and augmented reality devices. The metaverse can include a virtual representation of most, if not all, aspects of the physical world in which we live.

The metaverse can be used as a medium for making transactions, such as banking or other financial transactions. Financial tools can be provided within the metaverse to enable avatars corresponding to users to perform transactions. There are risks of sensitive information, funds, and other valuables being observed and/or misappropriated by other avatars in the metaverse.

SUMMARY

Examples provided herein are directed to regulating access of particular environments to different avatars within the metaverse.

According to one aspect, a computer system for regulating access within a metaverse, includes: one or more processors; and non-transitory computer-readable storage media encoding instructions which, when executed by the one or more processors, causes the computer system to: when the computer system is operatively linked to a metaverse accessing device (MAD), create, with the MAD, a metaverse environment within the metaverse, the MAD being one of a virtual reality device or an augmented reality device, the metaverse environment providing restrictive access to avatars within the metaverse; receive credentials from a first avatar; and based on the credentials: permit the first avatar to access the metaverse environment; and modify a visualization of the metaverse environment for at least a second avatar positioned in the metaverse.

According to another aspect, a computer system for regulating access within a metaverse, includes: one or more processors; and non-transitory computer-readable storage media encoding instructions which, when executed by the one or more processors, causes the computer system to: when the computer system is operatively linked to a metaverse accessing device (MAD), create, with the MAD, a metaverse environment within the metaverse, the MAD being one of a virtual reality device or an augmented reality device, the metaverse environment providing restrictive access to avatars within the metaverse; receive credentials from a first avatar; and based on the credentials: permit the first avatar to access to the metaverse environment; deny a second avatar access to the metaverse environment; and permit a third avatar to access the metaverse environment.

According to another aspect, a computer system for regulating access within a metaverse, comprising: one or more processors; and non-transitory computer-readable storage media encoding instructions which, when executed by the one or more processors, causes the computer system to: when the computer system is operatively linked to a metaverse accessing device (MAD), create, with the MAD, a metaverse environment within the metaverse, the MAD being one of a virtual reality device or an augmented reality device, the metaverse environment providing restrictive access to avatars within the metaverse; receive credentials from a first avatar; and based on the credentials: permit the first avatar to access the metaverse environment; modify a visualization of the metaverse environment for a second avatar positioned in the metaverse; deny the second avatar access to the metaverse environment; and permit a third avatar to access the metaverse environment.

The details of one or more techniques are set forth in the accompanying drawings and the description below. Other features, objects, and advantages of these techniques will be apparent from the description, drawings, and claims.

DETAILED DESCRIPTION

This disclosure relates to improvements in security and privacy of sensitive information, transactions, and valuables within the metaverse.

For a given user, the metaverse is augmented with an immersive environment with which an avatar corresponding to the user can interact. By interacting with the immersive metaverse environment, the avatar can perform actions or tasks related to the corresponding user's assets, such as a financial account of the avatar's user or a safe deposit box of the avatar's user.

For example, the avatar can withdraw and deposit currency and view an account balance using a virtual automated teller machine (ATM) located in a virtual financial institution branch within the immersive environment of the metaverse. The withdrawn currency can then be used by the avatar for transactions within the metaverse.

As another example, the avatar can deposit and withdraw objects from a virtual safe deposit box located in a virtual financial institution branch within the immersive environment of the metaverse. For instance, the virtual safe deposit box can provide a means for the primary avatar to view and otherwise access non-fungible tokens (NFTs) and other digital assets and valuables of the user corresponding to the avatar, such as cryptocurrency, a virtual driver's license, a virtual vehicle title, a digital key (e.g., for starting a vehicle), and so forth. In some examples, the virtual safe deposit box can be configured such that the avatar can deposit in the safe deposit box, and withdraw from the safe deposit box, digital assets such as NFTs, and other digital valuables. For instance, if the avatar acquires a NFT from somewhere else in the metaverse, the user can then go to the virtual financial institution branch and deposit the acquired NFT in the avatar's safe deposit box. If the avatar withdraws a NFT from the safe deposit box, the avatar can then proceed to trade or sell the NFT somewhere else in the metaverse.

These types of financial or banking interactions between the avatar and the financial institution within the metaverse can be fraught with security and privacy risks. For example, unauthorized avatars associated with other metaverse users can follow an avatar into a financial institution bank and view sensitive information, such as an ATM Personal Identification Number ("PIN"), a bank account balance, or a currency withdrawal amount, as well as sensitive financial assets and digital valuables, such as NFTs and digital keys stored in a safe deposit box. These types of sensitive information can be misappropriated by unauthorized avatars to perform acts of financial theft or fraud within the metaverse, as well as by those avatars' corresponding metaverse users in the real world.

There can be various advantages associated with the technologies described herein. For instance, inadvertent and intentional viewing or other access of sensitive information and assets by unauthorized avatars can be deterred by modifying a visualization of an environment in which the sensitive information or assets is being accessed by an authorized avatar. According to examples of the present disclosure, visual aspects of a specific metaverse environment are manipulated as a way to improve the safety, security and privacy of the metaverse itself.

Further, by providing layered access to sensitive information and/or assets within a metaverse environment, trusted avatars can accompany an avatar into an otherwise private and secure metaverse environment in which sensitive information or assets may be viewed or otherwise accessed, while non-trusted avatars are denied entry to the environment. That is, the metaverse environment can provide differentiated access based on the level of trust, which can enhance the authorized avatar's experience within the metaverse. For instance, a mortgage officer may need access to certain account information of an avatar whose corresponding user is interested in purchasing a home and obtaining a mortgage to do so. Differentiated access according to the present disclosure can permit the mortgage officer's avatar to view sensitive financial information of the user by accompanying the user's avatar into the user avatar's virtual financial institution branch within the metaverse environment created by that financial institution, while preventing other avatars who may be at or near the same metaverse environment from entering with the user avatar. Thus, differentiated access can enable and facilitate certain interactions and transactions within the metaverse that would not be possible or practical within the metaverse if every avatar were given access to sensitive information or assets, or only one avatar were given access to such sensitive information or assets.

Figure 1:
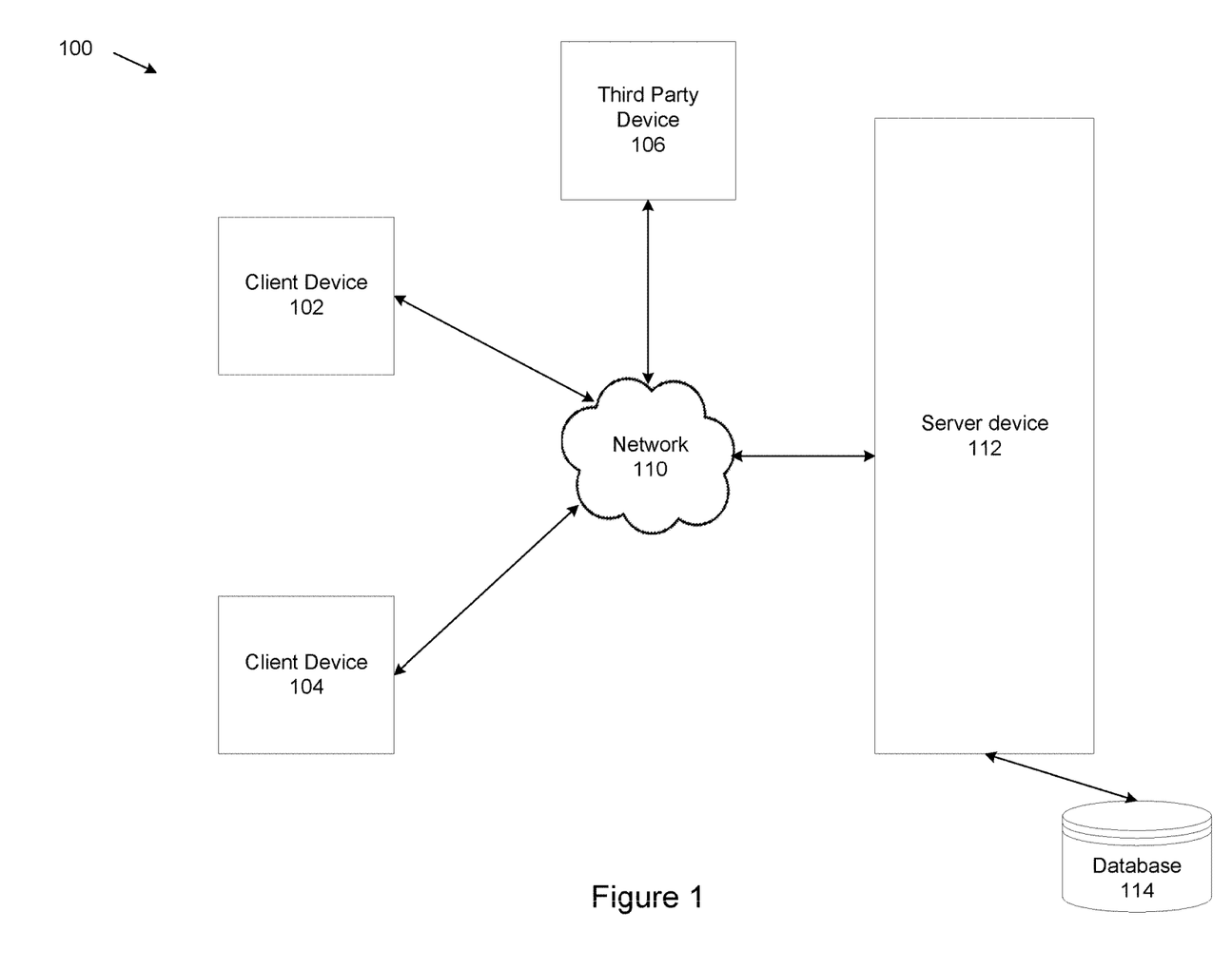
FIG. 1 shows an example system for providing differential access to avatars in a metaverse environment, in accordance with the present disclosure.

FIG. 1 shows an example system for providing differential access to avatars in a metaverse environment, in accordance with the present disclosure.

In this example, the system 100 can be a computing environment that includes a plurality of client and server devices. In this instance, the system 100 includes client devices 102, 104, a third party device 106, a server device 112, and a database 114. The client devices 102, 104 and the third party device 106 can communicate with the server device 112 through a network 110 to accomplish the functionality described herein.

Each of the devices may be implemented as one or more computing devices with at least one processor and memory.

Example computing devices include a mobile computer, a desktop computer, a server computer, or one or more other computing devices such as a server farm or cloud computing used to generate or receive data.

For instance, in some examples, the devices include virtual and/or augmented reality devices that facilitate the creation of a metaverse in which individuals can interact via their avatars. The metaverse can be an immersive world that is facilitated through the use of the virtual and augmented reality devices. Examples of such devices include virtual and/or augmented reality headsets that provide a three-dimensional experience associated with the metaverse.

In some examples, an individual can enter and interact within the metaverse using a virtual representation of themselves. This representation is referred to as an avatar, which is an icon or figure representing the individual. The avatar can be used to interact within the metaverse and can have certain preferences, settings, and options associated therewith.

In some non-limiting examples, the server device 112 is owned by a financial institution, such as a bank. The client devices 102, 104 and the third party device 106 can be programmed to communicate with the server device 112 via the network 110 to generate interactive metaverse environments as described herein. Many other configurations are possible.

The example client device 102 is a virtual reality device (VRD) programmed to access a metaverse and display an environment of the metaverse.

The example client device 104 is an augmented reality device (ARD) programmed to access a metaverse and display an environment of the metaverse.

The system 100 can include more than two client devices with virtual reality and/or augmented reality capabilities. Alternatively, the system 100 can include just one such client device.

According to certain embodiments of the system 100, at least two virtual reality and/or augmented reality capable devices are operating simultaneously, with one of the at least two devices being operated by a primary authorized user, and another of the at least two devices being operated by either a trusted secondary user with respect to the primary authorized user, or a non-trusted secondary user with respect to the primary authorized user. The primary authorized user is authorized to have full access to particular sensitive information and/or assets, e.g., sensitive information and/or assets that are personal to and/or owned by the primary authorized user.

The example third party device 106 is programmed to provide a metaverse accessible by the client device 102 and the client device 104. In some examples, the metaverse is provided by another device, such as the server device 112, in which case the system 100 need not include the third party device 106.

The example server device 112 is programmed to generate an environment that is immersive and interactive, and provides differentiated access to different avatars within a metaverse containing the metaverse environment. In some examples, the server device 112 is programmed to generate the metaverse itself. In other examples, the server device 112 is programmed to augment a metaverse generated by another, such as the third party device 106.

The example database 114 can include a single database or multiple databases. If the database 114 includes multiple databases, the databases can be centralized or decentralized. The database can store website data (e.g., data obtained from website using a web crawling machine of the server device 112), customer account data, customer profile data, and other data related to financial factors and other factors that impact financial transactions, such as interest rate data, taxes data, legislative data, regulatory data, insurance data, municipal data, real estate zoning data, credit scores data, credit ratings data, home pricing data, home listings data, geographic maps data, vehicle pricing data, vehicle listings data, credit card terms and conditions data, bank account terms and conditions data, investment account terms and conditions data, stock market data, commodities data, other securities data, and so forth.

The server device 112 and the database 114 have access to each other. The database 114 stores data that is accessed and used by the server device 112 to perform the server device's functionality as described herein. The database 114 can be managed by the same entity (e.g., a financial institution) as the server device 112. Alternatively, the database 114 can be a shared database to which the server device 112 has selective, partial access.

The database 114 can store rules that can be applied by the server device 112 to configure the metaverse environment generated by the server device 112 based on trust level of different avatars who may be present in the metaverse, as well as other factors, such as the type or level of sensitivity of information or assets being viewed or transacted.

The network 110 provides a wired and/or wireless connection between the client devices 102, 104, the third party device 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
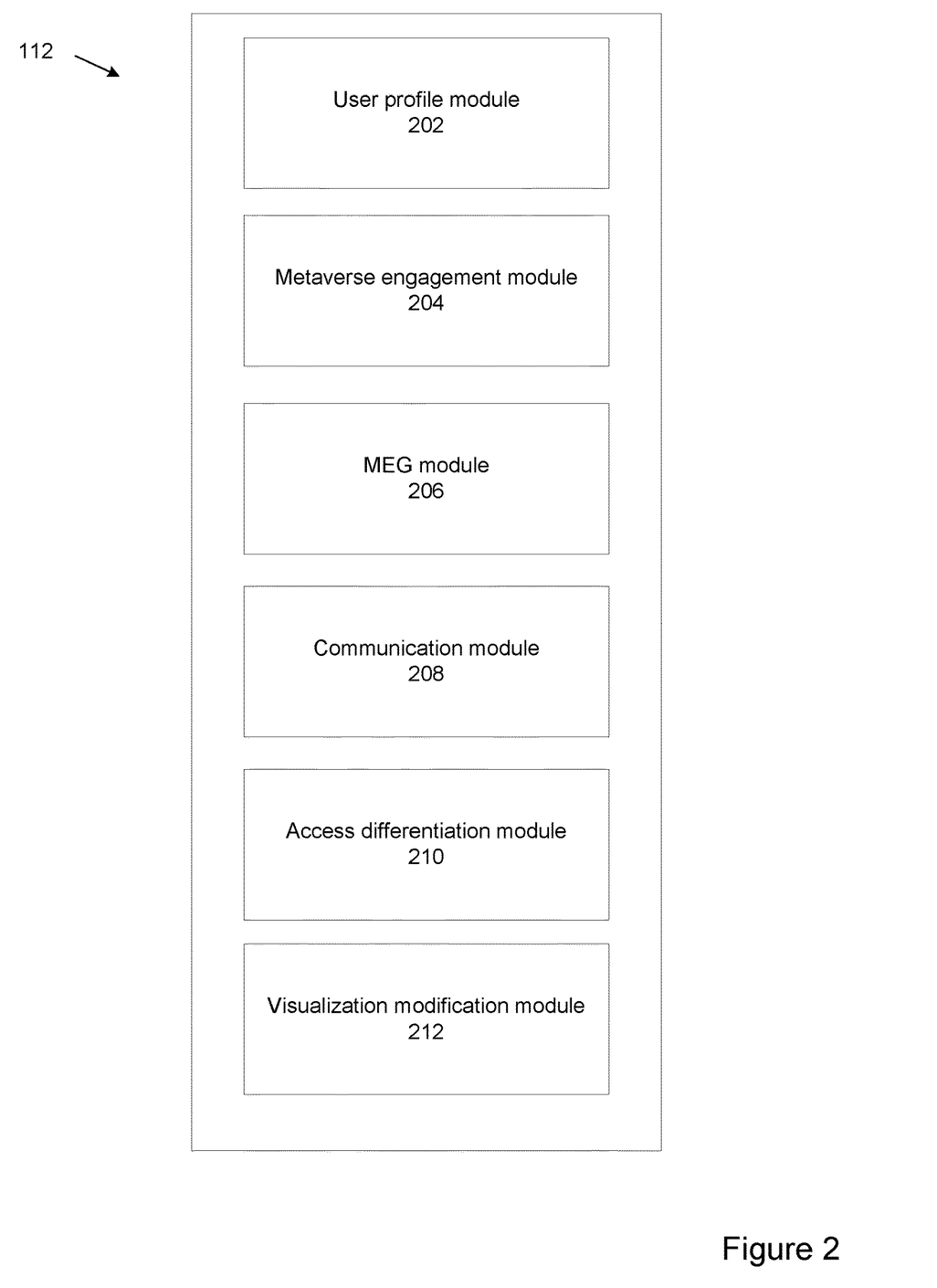
FIG. 2 shows example logical components, in accordance with the present disclosure, that can be stored on the database of the system of FIG. 1 and executed by the server device of the system of FIG. 1.

FIG. 2 shows example logical components, in accordance with the present disclosure, that can be stored on the database of the system of FIG. 1 and executed by the server device of the system of FIG. 1.

Referring to FIG. 2, additional details of the server device 112 are shown. In this example, the server device 112 has various logical modules that assist in providing differential access to avatars in a metaverse environment. The server device 112 can, in this instance, include a user profile module 202, a metaverse engagement module 204, a metaverse environment generation (MEG) module 206, an access differentiation module 210, and a visualization modification module 212. In other examples, more or fewer modules providing different functionality can be used. If the server device 112 generates its own metaverse, the server device 112 can also include a metaverse generation engine configured to generate a metaverse.

The user profile module 202 is configured to access account information (e.g., bank account information, investment account information) and other sensitive and non-sensitive personal information and assets (e.g., name, address, age, employer, job title, biometric information and other user identity credentials, income, assets, education, family data, etc.) when a metaverse user, such as an avatar of a customer of a financial institution, logs into the financial institution's environment within the metaverse.

For example, a customer of a financial institution dons, holds or otherwise engages a metaverse accessing device (MAD) such as an augmented reality device headset or a virtual reality device headset. Using the MAD, the customer logs into the metaverse, thereby activating the customer's avatar (referred to herein as a primary avatar, authorized avatar, or primary authorized avatar) within the metaverse. The primary avatar can then visit a virtual branch of the financial institution positioned within the metaverse. Upon arrival at the virtual branch, the primary avatar can be prompted for credentials, e.g., log-in credentials for an account or accounts held by the customer and managed at the financial institution, or to access any assets of the primary avatar managed by the financial institution, and information associated with such assets.

The user profile module 202 can be configured to generate such prompts for credentials upon the primary avatar's arrival or other predefined interaction (e.g., opening of a door of the virtual branch) by the primary avatar with the virtual branch.

The user profile module 202 determines whether the credentials are acceptable. If the credentials are not accepted, the user profile module 202 is configured to deny the primary avatar access to the financial institution's metaverse environment. If the credentials are accepted, the user profile module 202 is configured to grant the primary avatar access to the financial institution's metaverse environment. In one example, upon being granted access, the primary avatar accesses the financial institution's metaverse environment by entering the virtual branch of the financial institution within the metaverse.

Other ways for a user to access the metaverse and for the user's avatar to access the metaverse environment of the financial institution are possible.

The metaverse engagement module 204 is configured to enable the financial institution to access a metaverse as a metaverse environment host. For example, if the metaverse is created by a third party, the metaverse engagement module 204 enables the financial institution to access the metaverse and to have a presence that can serve its customers' or prospective customers' avatars within the metaverse.

Once the metaverse engagement module 204 has gained host environment access to the metaverse, the metaverse environment generation (MEG) module 206 is configured to generate (e.g., to build) an environment within the metaverse that is specific to the financial institution. Thus, for example, the MEG module 206 is configured to generate the virtual branch (or another environment through which an avatar can initiate and be involved in activities pertaining to avatar's assets) within the metaverse and all the visual, audial, and interactive features that accompany that environment.

For instance, if the environment includes a visualization of a branch of the financial institution, then the MEG module 206 can generate a visualization of the exterior of the branch building, a visualization of the interior of the branch building once the avatar gains access, such as a room within the branch that has a virtual ATM as well as the communication, transactional, and other visualizations specific to the financial institution's metaverse environment, as described and shown herein.

The communication module 208 is configured to communicate with an avatar (e.g., the primary avatar) that has been granted access to the financial institution's virtual environment. Communication can be performed in any suitable manner, such as with a chat box or with an avatar virtual agent of the financial institution. The communication module 208 can provide live communications, or automatically generated communications selected based on requests and other inputs provided by the primary avatar within the financial institution's virtual environment. Thus, the communication module 208 is configured to determine a reason for the primary avatar's visit to the financial institution's virtual environment and, based on communications from the primary avatar, to display and otherwise provide access to modify assets or information, facilitate transactions, and so forth.

In some examples, the communication module 208 is configured also to enable communication between avatars within the financial institution's virtual environment, e.g., between a primary avatar and a trusted avatar, even though the trusted avatar is not affiliated with the financial institution. For instance, the communication module 208 can generate communication paths between such avatars provided the avatars are located within the financial institution's virtual environment. The communication paths can be used by the avatars located within the financial institution's virtual environment to communicate via text or speech, for example, suing their metaverse enabled devices (e.g. augmented reality and/or virtual reality headsets).

The access differentiation module 210 is configured to determine levels of access for different avatars once a primary avatar has been granted access to the financial institution's virtual environment, or a defined area within the virtual environment, such as a room with an ATM. For example, the access differentiation module 210 can determine if a secondary avatar is a trusted avatar with respect to the primary avatar or a non-trusted avatar, e.g., based on a relationship between the primary avatar and each secondary avatar. Each relationship can be determined based on the primary avatar's user profile and/or credentials.

A trusted avatar may correspond to a person trusted with respect to the user corresponding to the primary avatar, such as a close family member (e.g., a domestic partner, a child, a parent) a business partner, or another trusted third party such as a third party that owes a fiduciary duty to the user corresponding to the primary avatar (e.g., a lawyer representing the user corresponding to the primary avatar, or a loan officer facilitating execution of a home mortgage for the user corresponding to the primary avatar).

In some examples, the primary avatar's credentials used to gain access to the financial institution's metaverse may have encoded therein identifications (e.g., encoded tags) of trusted secondary avatars. The access differentiation module can compare those encoded identifications to credentials provided by a secondary avatar to determine if the secondary avatar is trusted or not. In some examples, identifications of trusted secondary avatars and their level of trust can be stored in, and retrieved from, the primary avatar's user profile.

Similarly, there can be different levels of trust among trusted avatars. The access differentiation module determines the level of trust for a given secondary avatar that has provided credentials and, based thereon, determines which information or assets within the financial institution's metaverse environment may be accessed (e.g., viewed) by the secondary avatar, and which may not.

For example, an avatar corresponding to a child of the user corresponding to the primary avatar may be permitted to view an amount of a currency withdrawal, but not the account balance. An avatar corresponding to a business partner of the user corresponding to the primary avatar may be permitted to view a business account balance and all transactions involving the business account, but may not be permitted to view a social security number of the user corresponding to the primary avatar, or assets belonging to the user corresponding to the primary avatar that are stored in a virtual safe deposit box at the virtual financial institution branch.

The access differentiation module 210 applies rules to different secondary avatars to determine their level of access (including specifically what information and/or assets they may access and how). The access differentiation module 210 is also configured to serve as the gatekeeper, by denying access to any asset or other sensitive information of the primary avatar by any secondary avatar not authorized to have such access, even if such secondary avatar is otherwise considered a trusted avatar.

To differentially deny access based on the rules applied by the access differentiation module 210, the visualization modification module 212 is configured to distort (e.g., by blurring) different portions of visualizations of, or within, the metaverse environment of the financial institution for different avatars via the MADs used by those avatars' corresponding users.

For instance, the visualization modification module 212 can cause a bank account balance of the primary avatar to appear blurred and illegible to a secondary trusted avatar corresponding to a child of the user corresponding to the primary avatar, whereas an amount of a currency withdrawn by the primary avatar may be viewable and legible to such a secondary trusted avatar. As another example, an avatar of a loan officer (i.e., another trusted secondary avatar) facilitating a mortgage for a residential home purchase for the primary avatar may be permitted within the financial institution metaverse environment to view employment and debt information associated with the primary avatar, but all information relating to the primary avatar's business account may be distorted so as to be illegible.

Thus, the visualization modification module 212 is configured to generate avatar specific visual distortions, based on the determined differential access level of the avatar, within the metaverse environment of the financial institution, or within the metaverse more broadly (e.g., by distorting the appearance of the entire branch of the financial institution).

Figure 3:
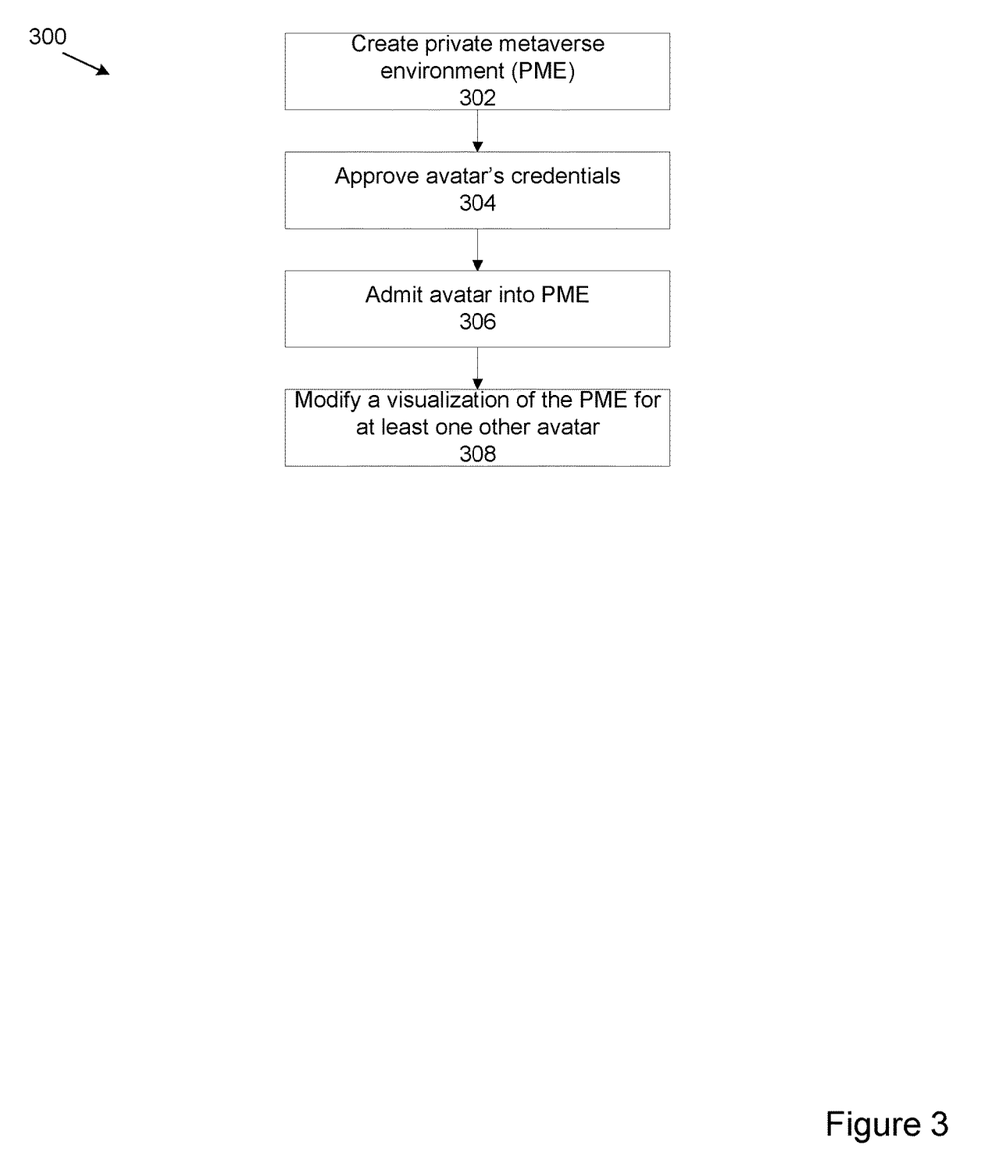
FIG. 3 shows an example method that can be performed using the system, or one or more portions thereof, of FIG. 1.

FIG. 3 shows an example method 300 that can be performed using the system, or one or more portions thereof, of FIG. 1.

Embodiments of methods according to the present disclosure need not include all of the steps of the method 300. In some embodiments, the steps can be performed in a different order.

At a step 302 of the method 300, a private metaverse environment (PME) is created. For example, the MEG module 206 (FIG. 2) can create a virtual bank branch within the metaverse, where the virtual bank branch is configured to provide differential access to avatars as described herein.

At a step 304 of the method 300, an avatar's credentials are approved. For example, a primary avatar provides a password, a PIN, biometric information, and/or other credentials within the metaverse.

At a step 306 of the method 300, the primary avatar is admitted to the PME based on the credentials, e.g., by comparing and matching the credentials to the primary avatar's personal profile using the user profile module 202 (FIG. 2).

At a step 308 of the method 300, a visualization of the PME is modified (e.g., blurred or otherwise distorted) as viewed by at least one secondary avatar using a MAD, based on an identification of the secondary avatar, e.g., by comparing and matching the identification to trusted avatar data in the primary avatar's user profile or encoded in the primary avatar's credentials.

Which aspects of a visualization or visualizations are distorted can depend on whether the secondary avatar is trusted or not trusted and, if trusted, the level of trust accorded to the secondary avatar as provided by e.g., the primary avatar's user profile or as encoded in the primary avatar's credentials. The visualization distortions are configured to obscure sensitive information or assets accessed by the primary avatar within the metaverse environment from being viewed or otherwise accessed by the secondary avatar. The step 308 can be performed by the visualization modification module 212 in conjunction with the access differentiation module 210 (FIG. 2).

Figure 4:
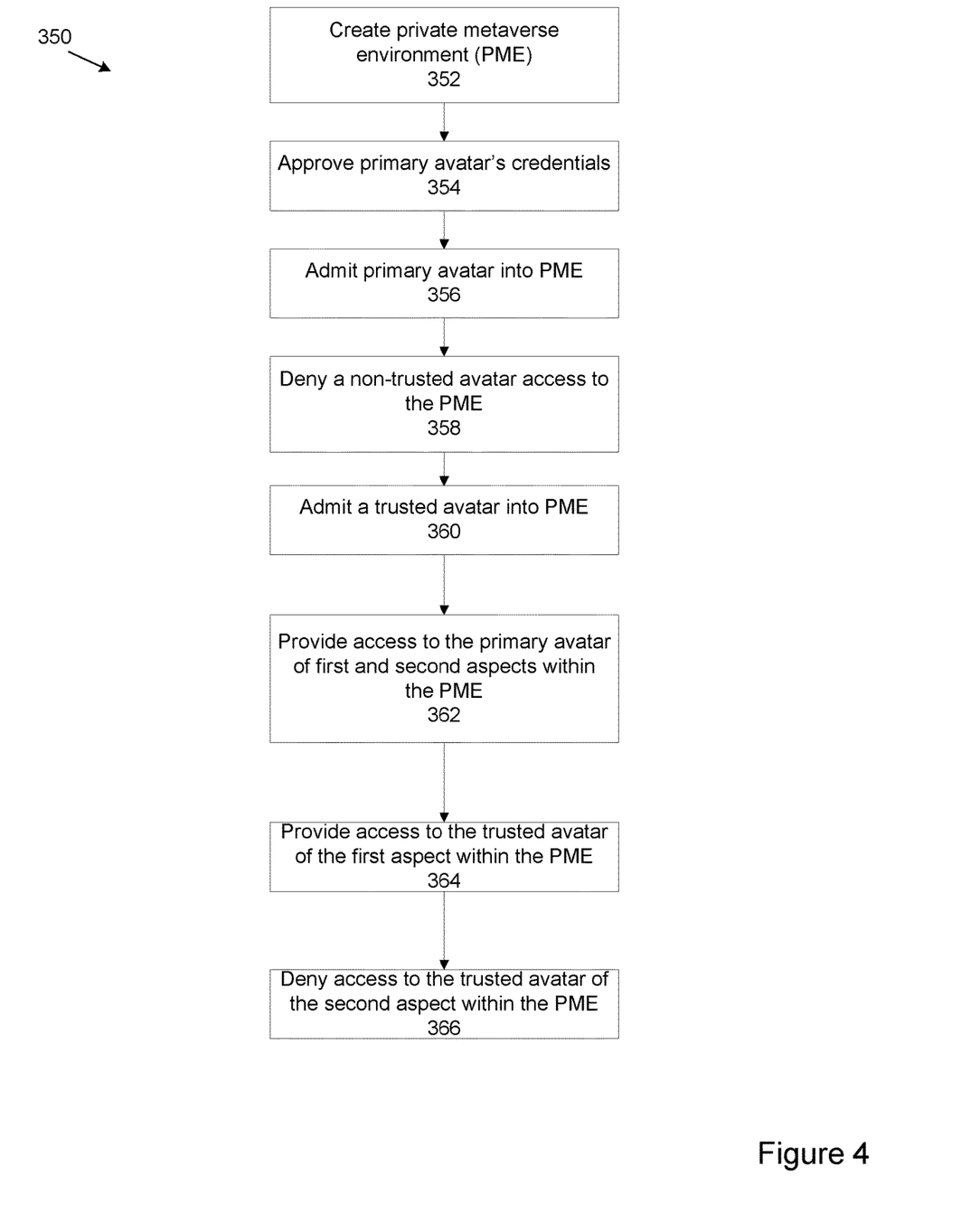
FIG. 4 shows another example method that can be performed using the system, or one or more portions thereof, of FIG. 1.

FIG. 4 shows another example method 350 that can be performed using the system, or one or more portions thereof, of FIG. 1.

Embodiments of methods according to the present disclosure need not include all of the steps of the method 350. In some embodiments, the steps can be performed in a different order.

At a step 352 of the method 350, a private metaverse environment (PME) is created. For example, the MEG module 206 (FIG. 2) can create a virtual bank branch within the metaverse, where the virtual bank branch is configured to provide differential access to avatars as described herein.

At a step 354 of the method 350, a primary avatar's credentials are approved. For example, a primary avatar provides a password, a PIN, biometric information, and/or other credentials within the metaverse.

At a step 356 of the method 350, the primary avatar is admitted to the PME based on the credentials, e.g., by comparing the credentials to the primary avatar's personal profile using the user profile module 202 (FIG. 2).

At a step 358 of the method 350, a non-trusted secondary avatar with respect to the primary avatar is denied access to the PME, e.g., based on the secondary avatar's credentials. The step 358 can be performed by the access differentiation module 210 (FIG. 2). In some examples, the step 358 can include distorting (using the visualization modification module 212 of FIG. 2) the entire visualization of the PME or a large portion of it.

At a step 360 of the method 350, a trusted secondary avatar with respect to the primary avatar is admitted to the PME, e.g., based on the secondary avatar's credentials. The step 360 can be performed by the access differentiation module 210 (FIG. 2).

At a step 362 of the method 350, the primary avatar is granted access (e.g., viewing access, manipulation access) to multiple sensitive aspects within the PME, such as an account balance of the primary avatar, the contents of a virtual safe deposit box of the primary avatar, etc. The step 362 can be performed by the access differentiation module 210 (FIG. 2).

At a step 364 of the method 350, access to one of the sensitive aspects is provided to the trusted secondary avatar e.g., the trusted secondar avatar is able to see the primary avatar's account balance within the PME. The step 364 can be performed by the access differentiation module 210 (FIG. 2).

At a step 366 of the method 350, the trusted secondary avatar is denied access to another aspect of sensitive information, such as the contents of the primary avatar's safe deposit box. The step 366 can be performed by the access differentiation module 210 (FIG. 2). In some examples, the step 366 can include distorting (using the visualization modification module 212 of FIG. 2) a sensitive aspect for which access is being denied to the secondary trusted avatar.

Figure 5:
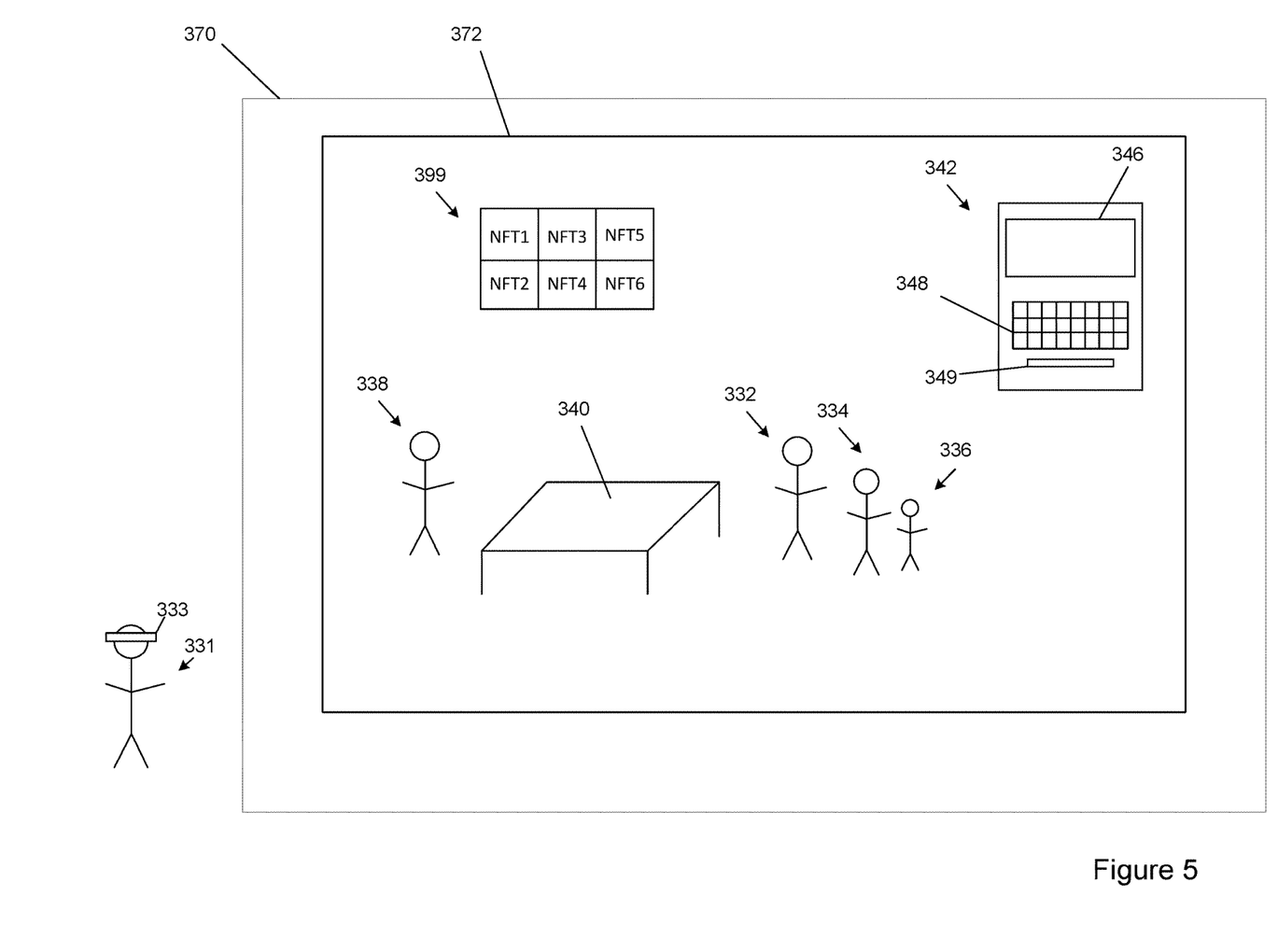
FIG. 5 shows a schematic representation of an example metaverse environment generated by the system of FIG. 1, as viewed by a primary avatar.

FIG. 5 shows a schematic representation of an example metaverse environment generated by the system of FIG. 1, as viewed by a primary avatar.

Referring to FIG. 5, a user 331 in the real world is wearing a MAD headset 333. Through the headset 333, the user 331 views a metaverse 370. The metaverse 370 includes a private metaverse environment (e.g., a bank branch) 372 hosted and operated by a financial institution.

The user 331 interacts within the metaverse 370 and the environment 372 with a primary avatar 332.

In the example scenario depicted in FIG. 5, the primary avatar 332 has gained access via credentials to the environment 372 and is in the environment 372 with a secondary avatar 338 corresponding to a loan officer to work on a mortgage application on a home for the primary avatar 332. The avatars 332 and 338 can work together on the mortgage application at a virtual table 340 positioned in the environment 372.

The secondary avatar 338 is controlled via a MAD worn by the loan officer in the real world.

The primary avatar 332 has brought their domestic partner and child along with them to the meeting, represented, respectfully, by secondary avatars 334 and 336.

The secondary avatars 334 and 336 are controlled via MADs worn, respectively, by the domestic partner and the child in the real world.

The secondary avatars 334, 336 and 338 are all trusted avatars, but with different trust levels vis a vis the primary avatar 332.

The primary avatar 332 is also accessing sensitive information within the environment 372, including the contents of a safe deposit box 399. The safe deposit box 399 includes a number of NFTs (or other digital valuables) of the user 331. The contents of the safe deposit box 399 can be viewed, removed, replaced, or otherwise accessed and manipulated by the primary avatar 332. For instance, the primary avatar 332 may be considering the value of the NFTs in the safe deposit box 399 when negotiating a mortgage with the loan office avatar 338, and therefore may wish to view them, remove them, sell them, etc.

The primary avatar 332 is also using a virtual ATM 342 within the environment 372. The virtual ATM 342 includes a display screen 346 that displays sensitive information, such as an account balance of the user 331. The virtual ATM 342 also includes a virtual keypad 348 for entering commands into the virtual ATM 342 by the primary avatar 332, and a virtual slot 349 for receiving virtual currency from the virtual ATM 342, or depositing currency. The primary avatar 332 has full access to all information displayed on the virtual ATM 342, and all functions of the virtual ATM 342 with respect to its financial accounts at the financial institution generating the environment 372

Figure 6:
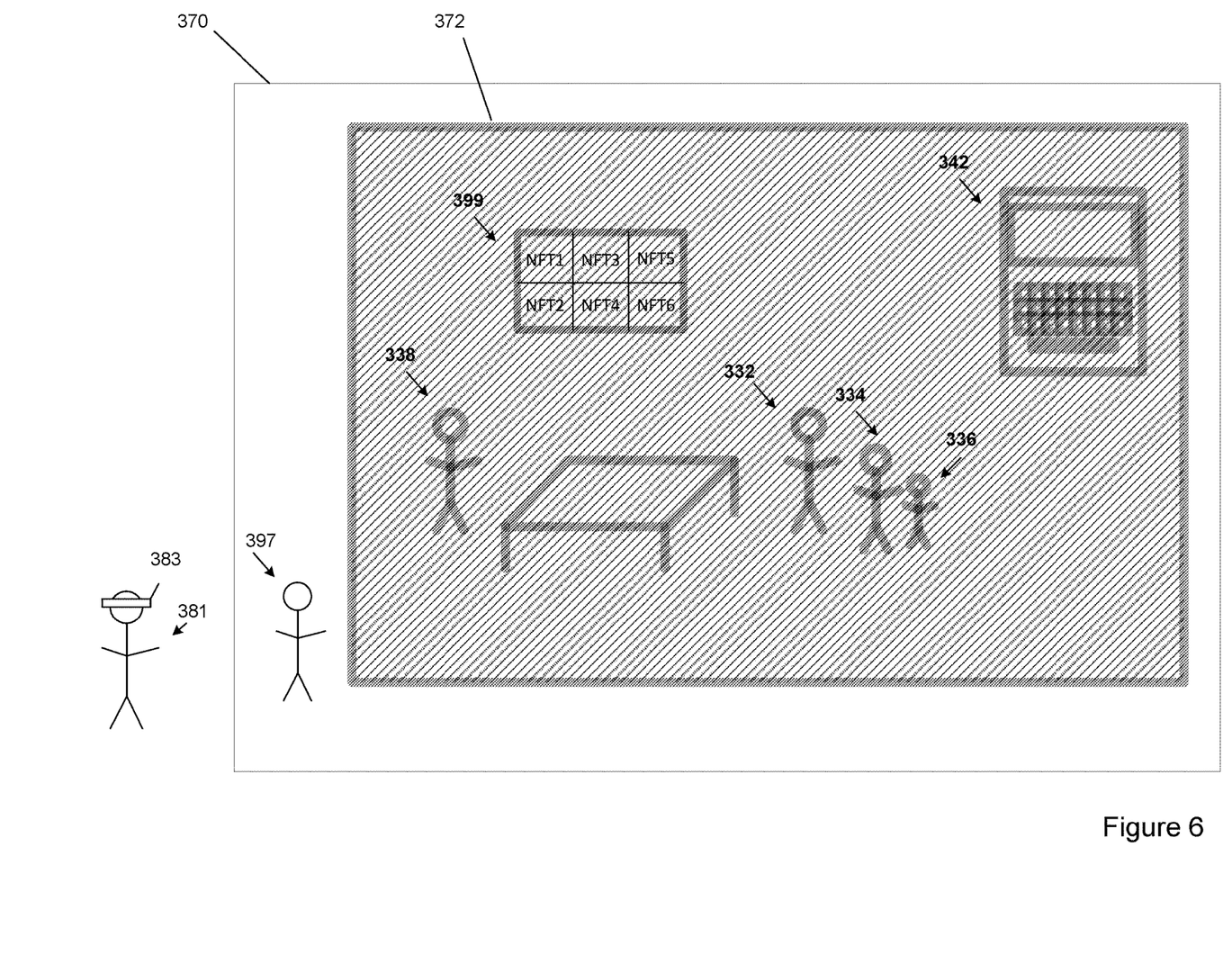
FIG. 6 shows a further schematic representation of the metaverse environment of FIG. 5 as viewed by a secondary, untrusted avatar.

FIG. 6 shows a further schematic representation of the metaverse environment of FIG. 5 as viewed by a secondary, untrusted avatar 397 corresponding to an untrusted metaverse user 381 wearing a MAD headset 383 in the real world.

As shown in FIG. 6, the avatar 397 is present in the metaverse 370. However, the visualization of the entirety of the environment 372, including any sensitive information, and even the visualizations of the avatars 332, 334, 336 and 338 that might otherwise reveal their identities, has been distorted (e.g., by distorting the lines of the visualization) to obscure all such sensitive information from the untrusted secondary avatar 397.

Figure 7:
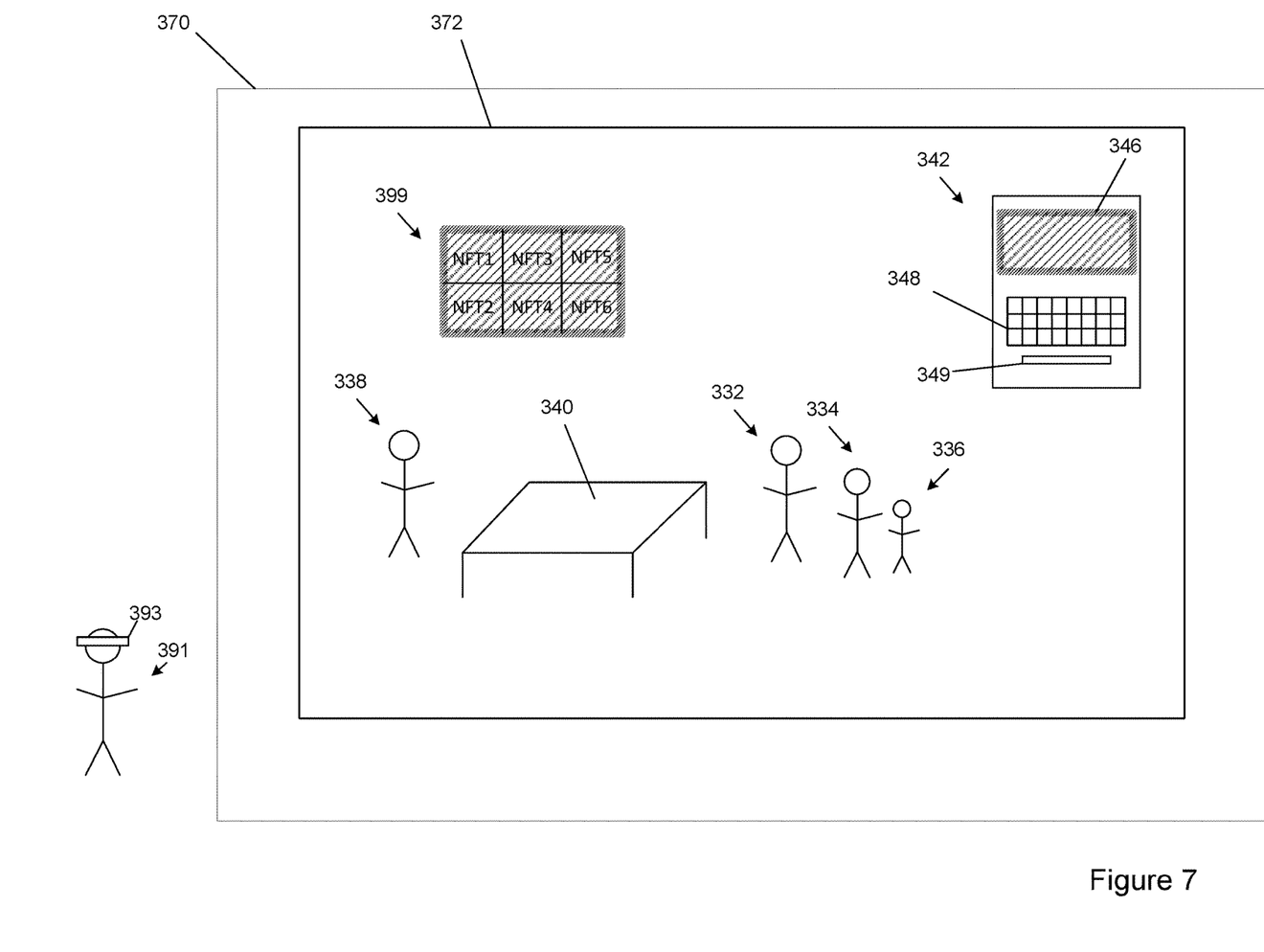
FIG. 7 shows a further schematic representation of the metaverse environment of FIG. 5, as viewed by a secondary, trusted avatar.

FIG. 7 shows a further schematic representation of the metaverse environment of FIG. 5, as viewed by a secondary, trusted avatar 336 corresponding to a child 391 of the primary user 331 (FIG. 5) and wearing a MAD headset 393 in the real world.

In this example, the secondary avatar 336 has a level of trust with respect to the primary avatar 332 such that the secondary avatar 336 can view and access certain sensitive information of the primary avatar 332, but not all such sensitive information.

In particular, the secondary avatar 336 can view the other avatars in the environment 372 at the mortgage application meeting, including the loan officer avatar 338.

The secondary avatar 336 can view communication exchanges between the primary avatar 332 and the loan officer avatar 338. For instance, the primary avatar 332 may have brought the secondary avatar 336 with them to the meeting within the environment 372 for the educational experience of the meeting.

The secondary avatar 336 can view an amount of currency withdrawn via the slot 349 of the virtual ATM 342. For instance, the secondary avatar 336 can view how much currency is withdrawn during the meeting by the primary avatar 332 (e.g., for a loan application fee) and given to the loan officer avatar 338.

Figure 8:
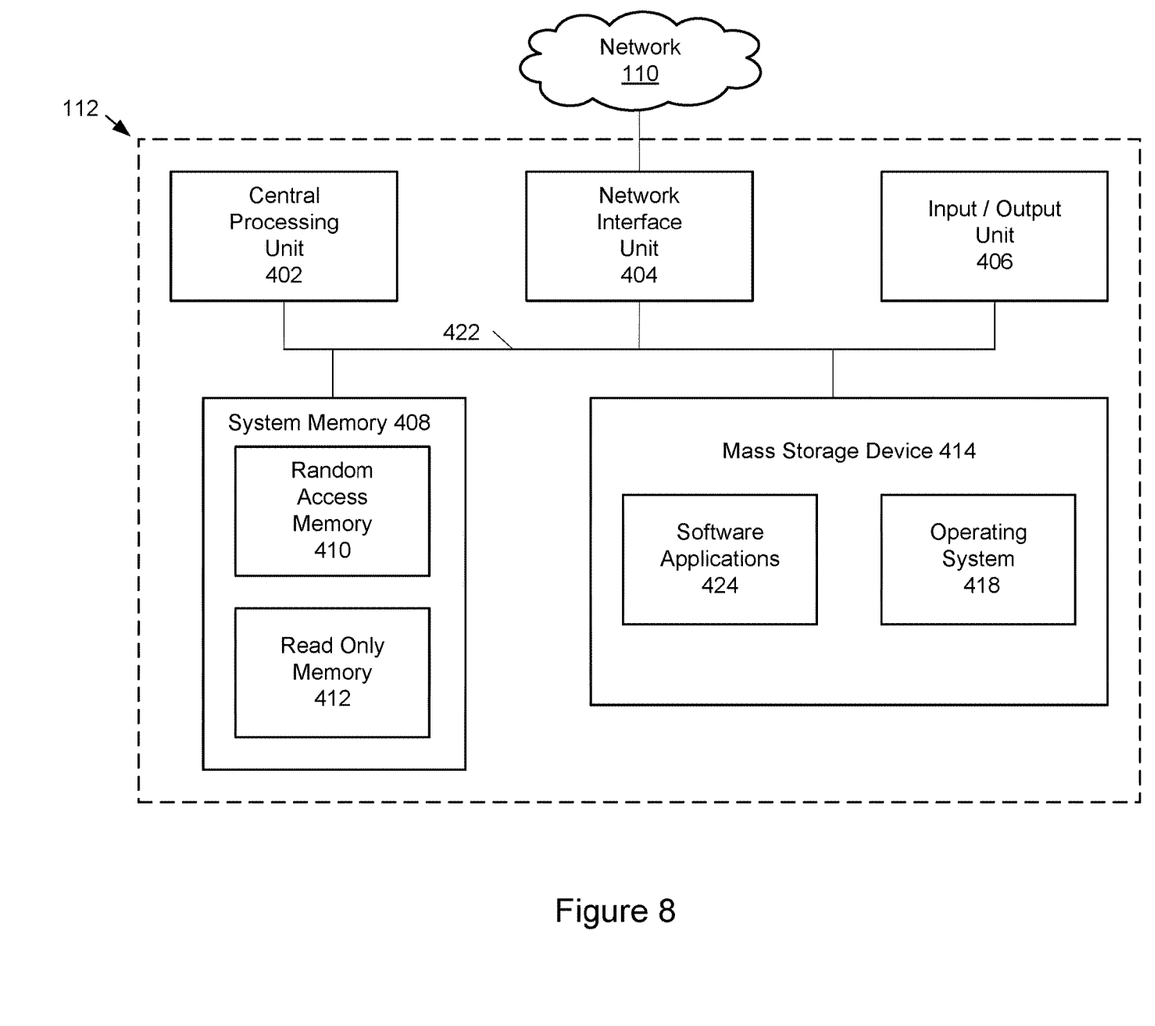
FIG. 8 shows example physical components of the server device of FIG. 1.

However, the secondary avatar 336 is at a level of trust such that the secondary avatar 336 is denied access to viewing the contents of the safe deposit box 399, as well as the bank account balance displayed on the display 346 of the virtual ATM 342. Therefore, the visualizations of the contents of the safe deposit box 399 and the display 346 (or a portion of the display 346) are distorted (e.g., by distorting the lines of the visualization) so as to obscure such sensitive information from being viewed or otherwise accessed by the secondary avatar 336. FIG. 8 shows example physical components of the server device 112 of FIG. 1.

As illustrated in the embodiment of FIG. 6, the example server device 112, which provides the functionality described herein, can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. In some examples, the memory or portions thereof can include the database 114 (FIG. 1). A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, Random Access Memory ("RAM"), Read-Only Memory ("ROM"), Erasable Programmable Read-Only Memory ("EPROM"), Electrically Erasable Programmable Read-Only Memory ("EEPROM"), flash memory or other solid-state memory technology, Compact Disc Read-Only Memories ("CD-ROMs"), digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for regulating access within a metaverse, comprising:
   one or more processors; and
   non-transitory computer-readable storage media encoding instructions which, when executed by the one or more processors, causes the computer system to:
      when the computer system is operatively linked to a metaverse accessing device (MAD), create, with the MAD, a metaverse environment within the metaverse, the MAD being one of a virtual reality device or an augmented reality device, the metaverse environment providing restrictive access to avatars within the metaverse;
   receive credentials from a first avatar; and
   based on the credentials:
      permit the first avatar to access the metaverse environment; and
      modify a visualization of the metaverse environment for at least a second avatar positioned in the metaverse,
      wherein the at least a second avatar is permitted access to the metaverse environment also based on a relationship of the at least a second avatar to the first avatar; and
      wherein the relationship is encoded in the credentials.

2. The computer system of claim 1, wherein modify the visualization of the metaverse environment includes to distort a visualization of an object within the metaverse environment.

3. The computer system of claim 2, wherein the visualization of the object includes a safe deposit box.

4. The computer system of claim 1,
wherein the metaverse environment includes a visualization of an automated teller machine (ATM); and
wherein modify the visualization of the metaverse environment includes to modify the visualization of the ATM.

5. The computer system of claim 4, wherein modify the visualization of the ATM includes to distort one or more lines of the visualization of the ATM.

6. The computer system of claim 1, including further instructions which, when executed by the one or more processors, causes the computer system to, based on the credentials, distort, for the second avatar, a visualization of the first avatar within the metaverse.

7. The computer system of claim 1, wherein the visualization of the metaverse environment includes a visualization of a branch of a financial institution.

8. A computer system for regulating access within a metaverse, comprising:
one or more processors; and
non-transitory computer-readable storage media encoding instructions which, when executed by the one or more processors, causes the computer system to:
when the computer system is operatively linked to a metaverse accessing device (MAD), create, with the MAD, a metaverse environment within the metaverse, the MAD being one of a virtual reality device or an augmented reality device, the metaverse environment providing restrictive access to avatars within the metaverse;
receive credentials from a first avatar; and
based on the credentials:
permit the first avatar to access to the metaverse environment;
deny a second avatar access to the metaverse environment; and
permit a third avatar to access the metaverse environment,
wherein the third avatar is permitted access to the metaverse environment also based on a relationship of the third avatar to the first avatar; and
wherein the relationship is encoded in the credentials.

9. The computer system of claim 8, including further instructions which, when executed by the one or more processors, causes the computer system to, based on the credentials, deny the third avatar access to a first aspect of the metaverse environment that the first avatar is accessing within the metaverse environment.

10. The computer system of claim 9, including further instructions which, when executed by the one or more processors, causes the computer system to, based on the credentials, permit the third avatar to access a second aspect of the metaverse environment that the first avatar is accessing within the metaverse environment.

11. The computer system of claim 10,
wherein the first aspect is a balance amount in a bank account of the first avatar; and
wherein the second aspect is a currency withdrawal amount by the first avatar from an automated teller machine (ATM) within the metaverse environment.

12. The computer system of claim 9, wherein the first aspect includes contents of a safe deposit box of the first avatar.

13. A computer system for regulating access within a metaverse, comprising:
one or more processors; and
non-transitory computer-readable storage media encoding instructions which, when executed by the one or more processors, causes the computer system to:
when the computer system is operatively linked to a metaverse accessing device (MAD), create, with the MAD, a metaverse environment within the metaverse, the MAD being one of a virtual reality device or an augmented reality device, the metaverse environment providing restrictive access to avatars within the metaverse;
receive credentials from a first avatar; and
based on the credentials:
permit the first avatar to access the metaverse environment;
modify a visualization of the metaverse environment for a second avatar positioned in the metaverse;
deny the second avatar access to the metaverse environment; and
permit a third avatar to access the metaverse environment,
wherein the third avatar is permitted access to the metaverse environment also based on a relationship of the third avatar to the first avatar; and
wherein the relationship is encoded in the credentials.

14. The computer system of claim 13, including further instructions which, when executed by the one or more processors, causes the computer system to, based on the credentials, disable, for the second avatar, a visualization of the first avatar within the metaverse.

15. The computer system of claim 13, including further instructions which, when executed by the one or more processors, causes the computer system to:
based on the credentials, deny the third avatar access to a first aspect of the metaverse environment that the first avatar is accessing within the metaverse environment; and
based on the credentials, permit the third avatar to access a second aspect of the metaverse environment that the first avatar is accessing within the metaverse environment.

16. The computer system of claim 15,
wherein the first aspect is a balance amount in a bank account of the first avatar; and
wherein the second aspect is a currency withdrawal amount by the first avatar from an automated teller machine (ATM) within the metaverse environment.

17. The computer system of claim 15, wherein the first aspect includes contents of a safe deposit box of the first avatar.

* * * * *